United States Patent [19]

Sperandio

[11] 3,935,030
[45] Jan. 27, 1976

[54] VALVE MEANS FOR AN ELECTROCHEMICAL STORAGE CELL OR THE LIKE

[75] Inventor: Francis Sperandio, Le Bouscat, France

[73] Assignee: SAFT-Societe des Accumulateurs Fixes et de Traction, Romainville, France

[22] Filed: Mar. 13, 1975

[21] Appl. No.: 558,176

[30] Foreign Application Priority Data
Mar. 21, 1974 France .................. 74.09705

[52] U.S. Cl. .............. 136/170; 136/178; 220/209
[51] Int. Cl.² ............................................ H01M 2/12
[58] Field of Search ....... 136/178, 170; 137/512.15, 137/512.4, 516.11; 220/209, 204

[56] References Cited
UNITED STATES PATENTS

| | | | |
|---|---|---|---|
| 1,633,224 | 6/1927 | Ogden | 136/170 |
| 2,376,712 | 5/1945 | Moran | 136/178 |
| 3,494,798 | 2/1970 | Teeter et al. | 136/178 |
| 3,630,786 | 12/1971 | Nishimura | 136/178 |

*Primary Examiner*—Donald L. Walton
*Attorney, Agent, or Firm*—Kenyon & Kenyon Reilly Carr & Chapin

[57] ABSTRACT

Valve means intended more particularly for a sealed storage cell battery; that valve is made to communicate with the compartments of all the storage cells by way of independent passages for piping gases from each cell to an exhaust passage. The valve is responsive independently to gas pressure conditions in each cell to open or close the particular passage from said cell irrespective of pressure conditions in other cells. It is thus used by all the storage cells.

5 Claims, 4 Drawing Figures

VALVE MEANS FOR AN ELECTROCHEMICAL STORAGE CELL OR THE LIKE

BACKGROUND AND BRIEF SUMMARY OF INVENTION

The present invention concerns a valve enabling the passing of a fluid in a determined direction as a function of an over-pressure. An application may be found for such a valve in electrochemical storage batteries for removing the gases which could be accumulated in cells thereof, at the end of the charge, during the overcharge and in the case of inversion.

Objects and features of the present invention are to provide a common exhaust valve for several cells of a same battery which will permit venting of gas independently from each cell irrespective of gas conditions in other cells of the battery.

One form of valve comprises a chamber communicating freely with a first space and communicating, moreover, with a second space. The chamber contains an elastically deformable part. This part is capable of stopping up the passage between the chamber and the second space, e.g. in a cell, when the excess of pressure prevailing, e.g., in the second space in relation to the pressure prevailing in the chamber is lower than a first predetermined value; it frees the passage by elastic deformation when the excess of pressure in the second space is higher than a second determined value, thus enabling the escaping of a fluid from the second space towards the first space. The said second value in that at which the valve opens, when the pressure in said second space increases. The first value is that at which the valve closes, when the said pressure again decreases. These two values may be identical or different. In the latter case, when the pressure is comprised between them, the valve may be open or closed according to the previous variation in the pressure. A valve according to the invention is characterized more particularly in that the chamber communicates with at least a third space, e.g. a second cell, the corresponding passage therefrom to said chamber being either stopped up or freed by the same elastically deformable part under like pressure value conditions as is the passage between the chamber and the first named second space. Thus, the single part in said second chamber is responsive to pressure differentials between the said chamber and those in the second and third spaces independently.

Another object and feature of the invention is also the provision of such a valve in a one-piece battery comprising at least two storage cells and whose case has two compartments respectively containing the two storage cells and constituting the second and third spaces previously defined. In that case, the valve chamber communicates on the one hand with the two compartments and on the other hand with the first space which may be the atmosphere. The communication with the atmosphere may be effected either by an opening formed in the lid or in the bottom of the casing.

In relation to conventional constructions having a valve for each storage cell, the present invention enables a reduction of costs, since only one single deformable part is required with a consequent saving of space which is all the more appreciable as the dimensions of the storage cells are smaller.

A valve according to the invention may be applied to a one-piece battery comprising any number of compartments provided respectively with means for leading the gases up to the chamber of the valve which is common to all the cells. It may be used, to great advantage, for four storage cells having a parallelepipedical shape with a common ridge. It is then placed at one of the ends of that ridge and the leading means are constituted simply by orifices made through the walls. In a battery having more than four storage cells, as many valves as there are sets of four storage cells may be provided.

Embodiments of a valve according to the invention applied to a battery of electric cells will be hereafter described herebelow with reference to the accompanying drawing, given by way of illustration but having no limiting character and in which.

DETAILED DESCRIPTION

Figure 1:
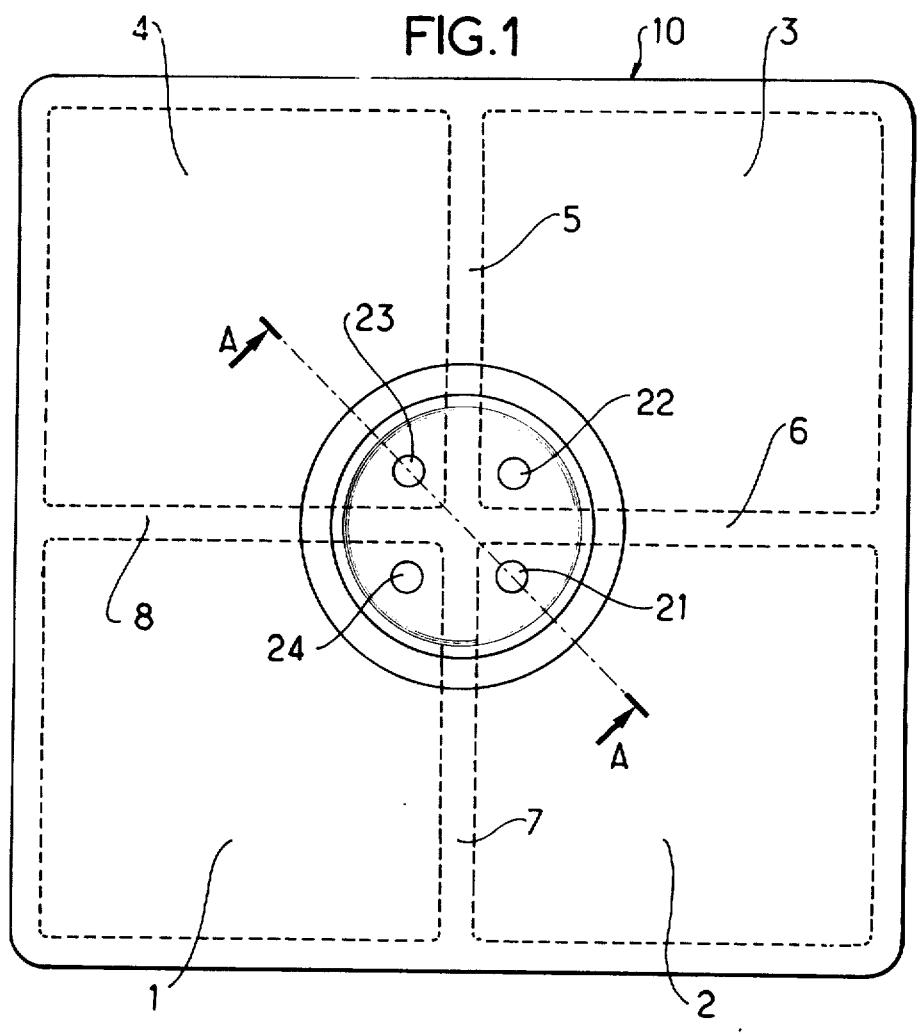
FIG. 1 is a top view of the casing in a first embodiment of a one-piece battery comprising four storage cells and from which the valve according to the invention has been removed.
Figure 2:
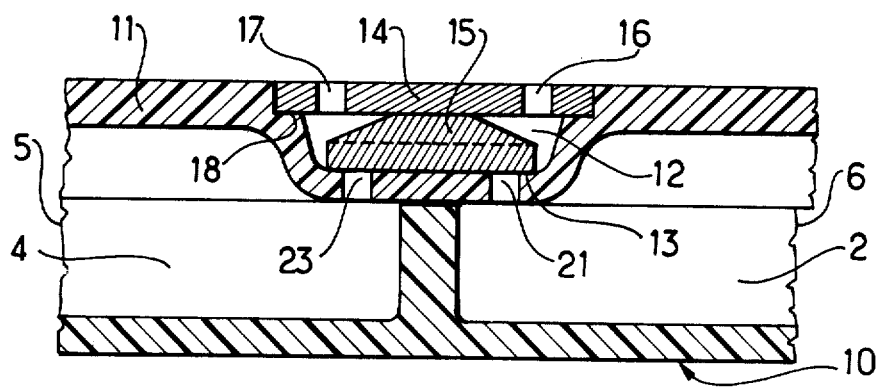
FIG. 2 is a partly sectional view through line A—A in FIG. 1, in which the valve has, moreover, been shown.

FIGS. 1 and 2 show the casing made, for example, of a plastic material, of a storage cell battery consisting of a container 10 closed by a lid 11 and separated by dividing walls 5, 6, 7, 8 into four inner compartments 1, 2, 3, 4, intended for respectively containing four storage cells. Valve means according to the invention is housed in the center of the cover 11. That valve means comprises a chamber 12 in the shape of a cup provided in the cover and communicating by openings or passages 21, 22, 23, 24 with respective of the compartments 1, 2, 3, 4. The chamber 12 contains a washer 15 made of an elastomer, supported on the bottom of the cup formed by the lid 11. The washer 15 is held in position by means of a valve lid 14 rigidly fixed, for example, by glueing or welding, in a recess or bore 18 provided in the top surface of the cover 11. The valve lid 14 has exhaust orifices 16 and 17 intended for keeping the chamber 12 in constant communication with the atmosphere.

The valve lid 14 when mounted in said recess or bore 18 exerts on the washer 15 a pressure which is determined as a function of the maximum tolerable pressure in the compartments 1, 2, 3, 4.

By way of an example, when the internal pressures in the compartment 4 becomes greater than its maximum tolerable pressure, the washer 15 is deformed and allows the gases to escape to atmosphere through the orifices 23 and 17, irrespective of pressure conditions in compartments 1, 2 and 3. The same applies when the pressure prevailing in the compartment 2 becomes greater than the tolerable pressure therein and likewise for compartments 1 and 3.

Thus, vent responsive operation of the single washer 15 is identical for each one of all the storage cells of the battery independently of pressure conditions in respective others of said cells.

Figure 3:
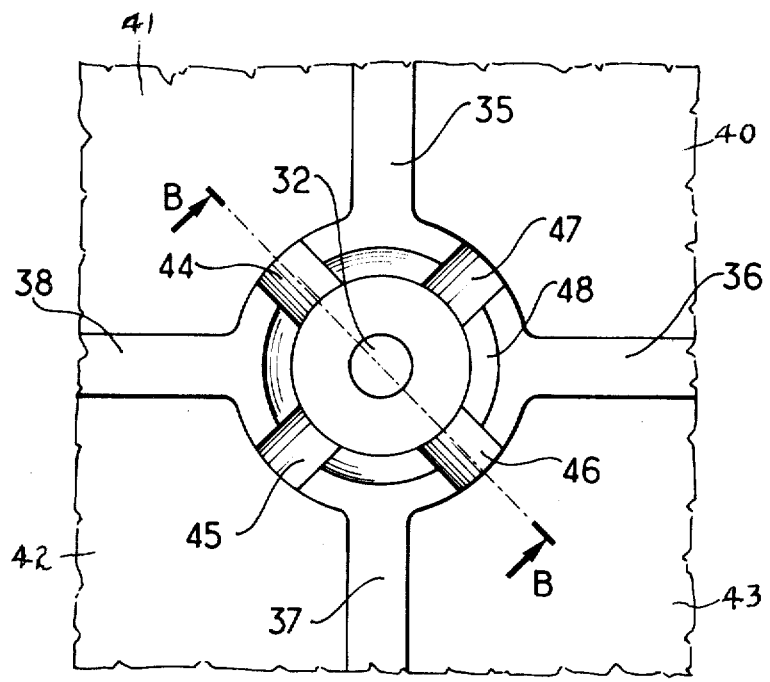
FIG. 3 shows partly a top view of the container of the casing in a second embodiment of a one-piece battery comprising four storage cells.
Figure 4:
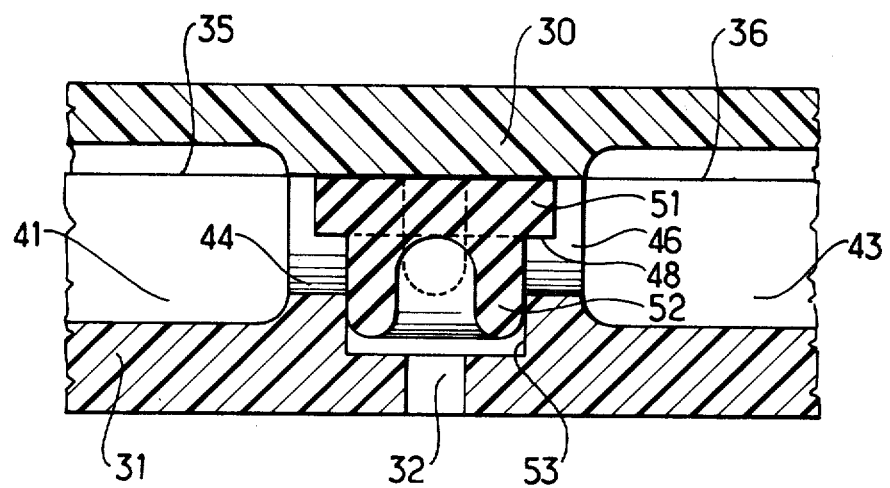
FIG. 4 shows a partly sectional view through line B—B in FIG. 3 which shows, moreover, the lid of the casing and a variant of a valve according to the invention.

FIGS. 3 and 4 show a variant of valve means according to the invention connected with a second example of a battery having four storage cells. FIG. 3 shows a top view of the container 31 of the battery casing separated by four dividing walls 35, 36, 37, 38 into four compartments 40, 41, 42, 43 intended for accommodating the said storage cells. The container 31 is closed by a lid 30.

Valve means according to the invention is arranged in the center of the container casing, its chamber 53 communicates by openings 44, 45, 46, 47 respectively with the four compartments 40, 41, 42 and 43 of the battery, two of which appear in FIG. 4 (compartments 41 and 43). Moreover, this chamber 53 communicates with the atmosphere by a passageway or funnel 32 bored in the bottom of the container 31. The body of the valve consists of a stopper 51 held between a shoulder 48 provided in the wall of the chamber and the internal face of the lid 30. This stopper is prolonged by a deformable skirt 52 made of an elastomer. The diameter of the skirt is adjusted to fit into the chamber 53 formed in the bottom of the container 31 and which chamber communicates with the passageway funnel 32. The adjustment of the diametrical clamping action of the skirt 52 against the wall of chamber 53 defines the opening pressure of the skirt 52 of the stopper 51. By way of an example, when the pressure in the compartment 41 becomes greater than its tolerable pressure, which latter is the adjusted clamping pressure of skirt 52, the skirt is deformed and allows the gases in compartment to pass via passage 40 and via the passage or funnel 32 outwardly of the battery to atmosphere.

Similar deformations of the skirt 52 relative to respective pressure increases in each of the other cell compartments 42, 43 or 44 will permit venting of gases to atmosphere respectively via respective passages or openings 45, 46 and 47 irrespective of pressure conditions in any of the other cells. To insure such independent venting, the skirt 51 may be slotted longitudinally in regions aligned with respective dividing walls 35, 36, 37 and 38 so that the respective portions of the skirt 52 closing respective openings 44, 45, 46 and 47 will be deformed independently by over-pressures in respective cells without deforming respective portions covering opening of cells in which no over-pressure exists.

Where the battery comprises more than four cell valve means similar to those described for four cells may be provided for any additional groups of adjacent cells.

While specific embodiments of the invention have been described and illustrated, variations within the scope of the appended claims of valve means are possible and are contemplated in the application to storage cell batteries having several compartments wherein any suitable means for leading gases from each one of adjacent compartments to the common valve chamber may be used.

What is claimed is:

1. Valve means comprising a chamber freely communicating with a first venting space and having a passage communicating with a second space and an elastically deformable part contained in the chamber, said part stopping up the communicating passage between the chamber and the said second space when an excess pressure prevails in the second space in relation to the pressure prevailing in the chamber is lower than a first determined value, and opening up the said communicating passage by elastic deformation when the said excess pressure is higher than a second predetermined value, thus enabling the escaping of a fluid from the said second space via said communicating passage toward the said first space, the said chamber communicating with at least a third space having a communicating passage corresponding to said first-named communication passage and also being stopped up and opened up by the responsive deformation of the said elastically deformable part under the same pressure conditions in said third space as of the pressures between the chamber and the second space, the opening and closing of respective of said communicating passages by said part being independent of pressure conditions in respective of said second and third spaces.

2. In a one-piece battery comprising at least two storage cells arranged respectively as two compartments of a casing, valve means according to claim 1 including said chamber, the said compartments respectively constituting the said second space and the said third space, and a lid.

3. A one-piece battery of storage cells according to claim 2, characterized in that it is provided with independent communicating passages for the gases contained in respective of said compartments each leading to the said chamber.

4. A one-piece battery of storage cells according to claim 2 comprising a casing including a container and a cover, characterized in that the said chamber has an opening communicating with the said first space, said opening being provided in the bottom of the said container.

5. A one-piece battery of storage cells according to claim 2, comprising a casing including a container and cover, characterized in that the said chamber has an opening communicating with the said first space and an opening being provided in the said lid.

* * * * *